A. DEFENBAUGH.
Mole-Plow.
No. 21,491.
Patented Sept. 14, 1858.
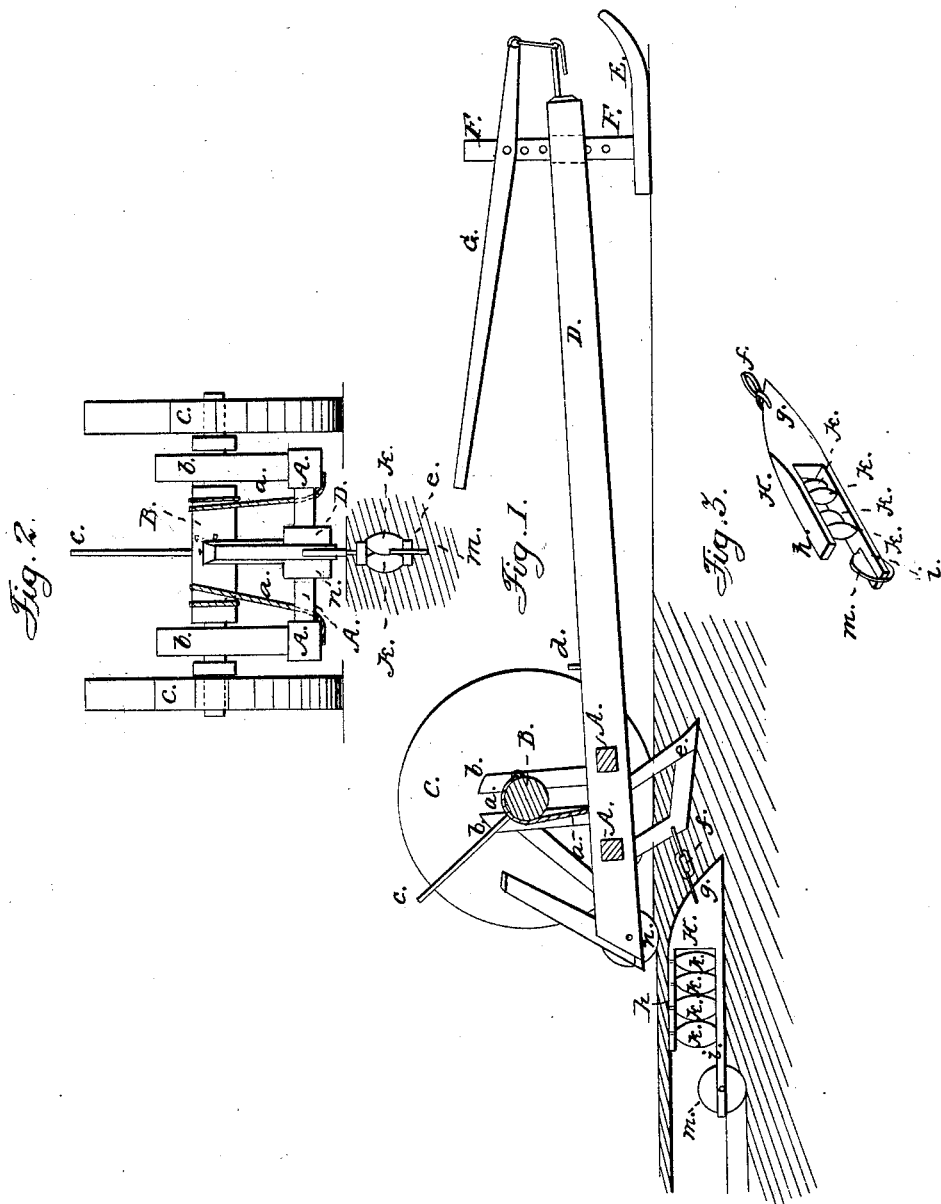

UNITED STATES PATENT OFFICE.

ADAM DEFENBAUGH, OF WALNUT RUN, OHIO.

IMPROVEMENT IN MOLE-PLOWS.

Specification forming part of Letters Patent No. 21,491, dated September 14, 1858.

*To all whom it may concern:*

Be it known that I, ADAM DEFENBAUGH, of Walnut Run, in the county of Madison and State of Ohio, have invented certain new and useful Improvements in Plows for Forming Underground Ditches; and I do hereby declare the following to be a full, clear, and exact description of the construction and operation of the same, reference being had to the accompanying drawings, making a part of this specification, in which—

Figure 1 represents a longitudinal section. Fig. 2 represents an end view, and Fig. 3 represents the plow detached.

My invention consists in certain improvements in a machine for forming ditches underneath the surface of the ground, whereby the plow can be lowered or raised to give the ditch a uniform inclination regardless of the undulations of the ground, and in connection with the plow a cutting-wheel for forming a trench in the bottom of the ditch, for a purpose that will be hereinafter explained.

To enable others skilled in the art to make and use my invention, I will proceed to describe the same with reference to the drawings.

A represents a frame, which is suspended to the axle B by means of ropes or chains $a\ a$, said axle being supported in turn in the wheels C C. On the frame A there are uprights $b\ b$, one on each side of the axle B, to cause said frame to keep its proper position with regard to the wheels when raised or lowered thereon.

D is a long beam secured to the frame A, and having at its forward end a shoe, E, which is attached to an arm, F, that passes through a mortise in the end of said beam, and adjustable therein by a lever, G, and a set-pin passing through any one of the series of holes in said arm F. The object of this adjustment in front is to give the plow its proper depth underneath the surface of the ground.

The axle B is furnished with a series of holes, into which a lever, $c$, may be inserted to turn the axle for raising or lowering the frame A on the wheels C. When the proper height is had then the lever $c$ is passed under a hook, $d$, in the beam D and there held. The operator stands or sits at a point on the beam D where he can readily reach and operate either or both of the levers G $c$.

$e$ is a colter or cutter, which penetrates the ground to a certain depth, it being fastened to the under side of the beam D. To the rear of this colter or cutter is hung by a link-joint, $f$, a mole or underground plow, H, made substantially as follows: The nose $g$ of the plow is solid, the point being the reverse of an ordinary plow-point—viz., made to run into instead of out of the ground—and thus the tendency of the mole-plow is to run into the ground, it being restrained from so doing solely by the frame and wheels. There is a top bar, $h$, and a bottom bar, $i$, on said plow, the latter being much the longer, said bars affording support for the journals of the double series of elongated rollers $k\ k$, which form the sides of said mole-plow. An area of the cross section of the plow which I use is about forty inches, and I thus form a ditch of that size in its cross-section.

In the end of the bottom bar, $i$, there is a cutter-wheel, $m$, which makes a score in the bottom of the ditch as it is formed. The object of this score is to direct the water to that part of the trench and let it wear away at that point by the action of the water, and thus protect the sides of the ditch, which would be more apt to cave in. The usual depth at which the plow is kept below the surface of the ground is from fifteen to eighteen inches, or more. In some cases the bottom of the ditch will be from three to four feet below the surface.

On the extreme rear end of the beam D there is an adjustable presser-wheel, $n$, which runs over the cut or score opened by the colter and presses it shut again to prevent any water from entering said score, so that as the ditch is formed underneath the ground all marks of it are destroyed on the surface.

When the machine is passing over a rise in the ground the operator lets the plow down deeper by lowering the frame. When it passes a depression in the surface it can be raised, and so also, as the nature of the soil changes from softer or harder material the plow may be deepened or raised, the object being to make the ditch as deep as possible with an ordinary team. These ditches in clay soils are very beneficial and last for some time before they become choked up, but are readily and easily opened again by the plow.

I am aware that underground-ditching plows have been used; but they have not been sufficiently under the control of the attendant to make them of much use. Besides they only make a ditch parallel with the surface of the ground, while mine will form a ditch with a regular grade or descent.

Having thus fully described the nature and object of my invention, what I claim therein as new, and desire to secure by Letters Patent, is—

1. So hanging the beam D, wheels C C, and underground-plow H to each other as that the conductor of the machine may at any time, without seeing the plow, raise and lower it, so that the ditch shall have a regular descent regardless of the undulations of the ground underneath which it is formed, and over which the plow passes.

2. In combination with the underground-plow, the scoring-wheel $m$, for forming a secondary trench in the bottom of the ditch, for the purpose set forth, and the friction-rollers for relieving it, as represented.

ADAM DEFENBAUGH.

Witnesses:
A. B. STOUGHTON,
THOS. H. UPPERMAN.